United States Patent
Khabashesku et al.

(10) Patent No.: US 9,938,771 B2
(45) Date of Patent: Apr. 10, 2018

(54) INITIATOR NANOCONSTITUENTS FOR ELASTOMER CROSSLINKING AND RELATED METHODS

(71) Applicant: Baker Hughes, a GE company, LLC, Houston, TX (US)

(72) Inventors: Valery N. Khabashesku, Houston, TX (US); James Edward Goodson, Porter, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 190 days.

(21) Appl. No.: 14/531,218

(22) Filed: Nov. 3, 2014

(65) Prior Publication Data

US 2016/0122299 A1    May 5, 2016

(51) Int. Cl.
*E21B 4/00* (2006.01)
*C08J 3/24* (2006.01)
*E21B 33/12* (2006.01)

(52) U.S. Cl.
CPC .............. *E21B 4/00* (2013.01); *C08J 3/24* (2013.01); *E21B 4/003* (2013.01); *E21B 33/1208* (2013.01); *C08J 2309/02* (2013.01)

(58) Field of Classification Search
None
See application file for complete search history.

(56) References Cited

U.S. PATENT DOCUMENTS

| | | | |
|---|---|---|---|
| 3,639,353 A | 2/1972 | Brown | |
| 3,663,475 A | 5/1972 | Figiel | |
| 4,063,907 A | 12/1977 | Lee et al. | |
| 5,759,216 A | 6/1998 | Kanada et al. | |
| 5,856,600 A | 1/1999 | Tanaka et al. | |
| 5,965,665 A | 10/1999 | Fukuyama et al. | |
| 6,337,060 B1 | 1/2002 | Hiraki et al. | |
| 6,342,301 B1 | 1/2002 | Yoshida et al. | |
| 6,372,002 B1 | 4/2002 | D'Evelyn et al. | |
| 6,681,849 B2 | 1/2004 | Goodson, Jr. | |
| 6,956,084 B2 | 10/2005 | Wang et al. | |
| 7,125,533 B2 | 10/2006 | Khabashesku et al. | |
| 7,452,519 B2 | 11/2008 | Khabashesku et al. | |
| 7,572,332 B2 | 8/2009 | Gruen | |
| 7,820,130 B2 | 10/2010 | Khabashesku et al. | |
| 8,062,748 B2 | 11/2011 | Khabashesku et al. | |
| 8,181,708 B2 | 5/2012 | Korte et al. | |
| 8,398,950 B2 | 3/2013 | Khabashesku | |
| 8,399,551 B2 | 3/2013 | Gong et al. | |
| 8,541,322 B2 | 9/2013 | Barrera et al. | |
| 8,784,520 B2 | 7/2014 | Chakraborty et al. | |
| 2004/0118762 A1 | 6/2004 | Xu et al. | |
| 2004/0216871 A1 | 11/2004 | Mendez et al. | |
| 2004/0223900 A1* | 11/2004 | Khabashesku ......... | B82Y 30/00 423/447.1 |
| 2005/0158549 A1 | 7/2005 | Khabashesku et al. | |
| 2005/0189279 A1 | 9/2005 | Xu et al. | |
| 2006/0081681 A1 | 4/2006 | Pipkin | |
| 2006/0171874 A1 | 8/2006 | Khabashesku et al. | |
| 2007/0082200 A1 | 4/2007 | Gruen | |
| 2007/0099792 A1 | 5/2007 | Khabashesku et al. | |
| 2007/0105998 A1 | 5/2007 | Gong et al. | |
| 2008/0103250 A1 | 5/2008 | Carlini et al. | |
| 2008/0121436 A1 | 5/2008 | Slay et al. | |
| 2008/0224413 A1 | 9/2008 | Doane et al. | |
| 2009/0076198 A1 | 3/2009 | Giesenberg et al. | |
| 2009/0152009 A1 | 6/2009 | Slay et al. | |
| 2009/0218276 A1 | 9/2009 | Linford et al. | |
| 2010/0089832 A1 | 4/2010 | Linford et al. | |
| 2010/0113696 A1 | 5/2010 | Khabashesku et al. | |
| 2010/0140562 A1 | 6/2010 | Shenderova et al. | |
| 2010/0187925 A1 | 7/2010 | Tingler et al. | |
| 2010/0234514 A1 | 9/2010 | Noguchi et al. | |
| 2010/0255311 A1* | 10/2010 | Lee ....................... | B22F 1/0018 428/403 |
| 2011/0033647 A1 | 2/2011 | Hsiao et al. | |
| 2011/0081494 A1 | 4/2011 | Khabashesku et al. | |
| 2011/0213046 A1 | 9/2011 | Choi | |
| 2011/0252711 A1 | 10/2011 | Chakraborty et al. | |
| 2012/0032543 A1 | 2/2012 | Chakraborty et al. | |

(Continued)

FOREIGN PATENT DOCUMENTS

EP          1447074 A2      8/2004

OTHER PUBLICATIONS

Qin, J. Am. Chem. Soc., 2004, 126(1), pp. 170-176.*
Matyjaszewski, Chem. Rev. 2001, 101, pp. 2921-2990.*
Von Werne, J. Am. Chem. Soc. 1999, 121, 7409-7410.*
Ueda, European Polymer Journal, 41 (2005) p. 193-200.*
Brieva et al., "A Sensible Route to Covalent Functionalization of Carbon Nanoparticles with Aromatic Compounds," Carbon, vol. 47, (2009), pp. 2812-2820.
Chang et al., "Facile Surface Functionalization of Nanodiamonds," Langmuir, vol. 26, No. 5, (2010), pp. 3685-3689.

(Continued)

*Primary Examiner* — Robert C Boyle (74) *Attorney, Agent, or Firm* — TraskBritt (57) ABSTRACT

An initiator nanoconstituent comprises a nanoparticle covalently bonded to a group having a free radical. The nanoparticle may be bonded to the group via an ether group or an amide group. The initiator nanoconstituent may be formed in situ, in a mixture comprising an elastomer material to be crosslinked. The initiator nanoconstituent is formed from an organic nanoconstituent compound that includes the nanoparticle and an organic group that does not include a free radical at the time the mixture is formed. At least one chemical bond of the organic nanoconstituent compound may be ruptured, in situ, to form the initiator nanoconstituent, which may then bond with polymer molecules of the elastomer material and form a crosslinked elastomer material. Downhole tools or components thereof may include such crosslinked elastomer material.

13 Claims, 2 Drawing Sheets

(56) References Cited

U.S. PATENT DOCUMENTS

| | | |
|---|---|---|
| 2012/0035309 A1 | 2/2012 | Zhu et al. |
| 2012/0039975 A1 | 2/2012 | Legaron Cabello et al. |
| 2012/0208934 A1 | 8/2012 | Korte et al. |
| 2013/0009339 A1 | 1/2013 | Ren et al. |
| 2013/0012635 A1 | 1/2013 | Ren et al. |
| 2013/0062049 A1 | 3/2013 | Ren et al. |
| 2013/0126190 A1 | 5/2013 | Mazyar et al. |
| 2013/0146312 A1 | 6/2013 | Gerrard et al. |
| 2013/0168894 A1 | 7/2013 | Ren et al. |
| 2014/0167312 A1 | 6/2014 | Ren et al. |

OTHER PUBLICATIONS

Huang et al., "Solubilization of Single-Walled Carbon Nanotubes with Diamine-Terminated Oligomeric Poly(ethylene Glycol) in Different Functionalization Reactions," Nano Letters, vol. 3, No. 4, (2003), pp. 565-568.

Khabashesku, V.N. "Covalent Functionalization of Carbon Nanotubes: Synthesis, Properties and Applications of Fluorinated Derivatives," Russian Chemical Reviews, vol. 80, No. 8, (2011), 21 pages.

Liu et al., "Functionalization of Carbon Nano-onions by Direct Fluorination," Chem. Mater., vol. 19, No. 4, (2007), pp. 778-786.

Liu et al., "Functionalization of Nanoscale Diamond Powder: Fluoro-, Alkyl-, Amino-, and Amino Acid-Nanodiamond Derivatives," Chem. Mater. vol. 16, No. 20, (2004), pp. 3924-3930.

McIntosh et al., "Benzoyl Peroxide Initiated in Situ Functionalization, Processing, and Mechanical Properties of Single-Walled Carbon Nanotube—Polypropylene Composite Fibers," J. Phys. Chem. C, vol. 111, No. 4 (2007), pp. 1592-1600.

Peng et al., "Sidewall Carboxylic Acid Functionalization of Single-Walled Carbon Nanotubes," J. Am. Chem. Soc., vol. 125, No. 49, (2003), pp. 15174-15182.

Weimer et al., "Direct Synthesis of Dispersed Nanocomposites by in Situ Living Free Radical Polymerization Using a Silicate-Anchored Initiator," J. Am. Chem. Soc. vol. 121, No. 7, (1999), 1615-1616.

International Search Report for International Application No. PCT/US2015/058639, (completed Jan. 27, 2016), 3 pages.

International Written Opinion for International Application No. PCT/US2015/058639, (completed Jan. 27, 2016), 5 pages.

\* cited by examiner

INITIATOR NANOCONSTITUENTS FOR ELASTOMER CROSSLINKING AND RELATED METHODS

FIELD

Embodiments of the present disclosure relate to crosslinked elastomers. More particularly, embodiments of the present disclosure relate to initiator nanoconstituents for crosslinking elastomers and to downhole tool components including elastomers crosslinked using the initiator nanoconstituents.

BACKGROUND

Elastomers are useful as materials of construction of elements for a variety of downhole applications, particularly those that require the sealing off of a portion of a borehole or that require constricting the space around an element, whether coaxial with the borehole or otherwise. Elastomers are also useful as coating materials to protect the surfaces of downhole tools.

Polymer compounds of elastomers are often crosslinked to improve the strength of the elastomer material. Some commercial elastomers also include filler materials, such as particles or fibers, to provide additional strength or abrasion resistance in the elastomer material. However, improvements in the abrasion resistance and strength of elastomers used in downhole applications are desirable.

BRIEF SUMMARY

Disclosed is an initiator nanoconstituent for crosslinking an elastomer. The initiator nanoconstituent comprises a nanoparticle covalently bonded to a subgroup comprising at least one free radical.

The disclosure also includes embodiments of a downhole tool comprising a crosslinked elastomer material. The crosslinked elastomer material comprises a polymer molecule bonded to a subgroup covalently bonded to a nanoparticle.

A method of forming a crosslinked elastomer material is also disclosed. The method comprises dispersing, in a precursor elastomer material, at least one compound to form a precursor mixture. The at least one compound comprises a nanoparticle bonded to a subgroup via an ether group or an amido group. The precursor mixture is heated to rupture at least one bond of the at least one compound, forming an initiator nanoconstituent comprising the nanoparticle and a terminal free radical. The initiator nanoconstituent is then bonded to a polymer molecule of the precursor elastomer material.

BRIEF DESCRIPTION OF THE DRAWINGS

While the specification concludes with claims particularly pointing out and distinctly claiming what are regarded as embodiments of the disclosure, various features and advantages of this disclosure may be more readily ascertained from the following description of example embodiments provided with reference to the accompanying drawings, in which:

DETAILED DESCRIPTION

The illustrations presented herein are not actual views of any particular compound, material, or article, but are merely idealized representations that are employed to describe embodiments of the present disclosure.

Initiator nanoconstituents disclosed herein include a nanoparticle covalently bonded to a subgroup having at least one free radical. The free radical of the initiator nanoconstituent provides a site for reaction with a polymer molecule of an elastomer to be crosslinked. When the initiator nanoconstituent reacts with the polymer molecule, a compound is formed comprising both the nanoparticle and the polymer molecule, indirectly bonded to one another via the subgroup. This interbonding of nanoparticles and polymers enables formation of a crosslinked elastomer material comprising a "nanoparticle-polymer" compound. The interbonding between the nanoparticles and the polymers may provide higher mechanical strength and higher abrasion resistance, in the crosslinked elastomer material, compared to a crosslinked elastomer material comprising merely a mixture of nanoparticle and polymer materials that are not bonded to one another, such as a dispersion of nanoparticles within a crosslinked polymer matrix.

The initiator nanoconstituents may be formed from functionalized nanoparticles that may be dispersed within a precursor elastomer material to form a precursor mixture. At least one bond of the functionalized nanoparticles may be ruptured, while present in the precursor mixture to form the initiator nanoconstituents, which include the free radical, in the presence of the precursor elastomer material. The initiator nanoconstituents may then react with the polymer molecules of the precursor elastomer material to form a "polymer nanocomposite" material, i.e., a material comprising interbonded nanoparticles and polymer compounds. As the initiator nanoconstituents react with the polymer molecules, the polymer molecules may also bond with one another, with other free radicals that may have derived from the initiator nanoconstituents, or with both. Thus, in situ crosslinking of the elastomer is provided by the use of the initiator nanoconstituents.

As used herein, the term "in situ," when referring to a process, means and includes a process that chemically alters a chemical substance (e.g., a mixture, a solution, or a suspension) without adding a new material to or isolating a material from the chemical substance in order to accomplish the chemical alteration. For example, as used herein, the term "in situ," when referring to formation of an initiator nanoconstituent within a chemical substance (e.g., a precursor mixture), means and refers to the formation of the initiator nanoconstituents from chemicals already present in the chemical substance (e.g., the precursor mixture), as opposed to forming the initiator nanoconstituent by adding a reactive agent to chemically alter a chemical within the chemical substance (e.g., the precursor mixture). As another example, as used herein, the term "in situ," when referring to crosslinking of a polymer within a chemical substance (e.g., the precursor mixture), means and refers to the formation of bonds between polymer molecules in the precursor mixture without adding a reactive agent to react chemically with the polymer molecules. Though an "in situ" process does not involve addition or isolation of materials from the chemical substance in order to accomplish the desired chemical alteration, the chemical alteration may inherently result in the addition or removal of one or more materials. For example, a chemical reaction may be carried out "in situ," in a chemical substance, without adding a reactive agent to the chemical substance and without isolating reactive agents from the chemical substance before the reactive agents react with one another. However, the chemical reaction may yield products (e.g., new chemical compounds) that alter the composition of the chemical substance. Alternatively or additionally, the chemical reaction may yield gaseous products, or volatile liquids, that inherently leave a liquid or solid chemical substance as the chemical reaction is carried out "in situ."

As used herein, the term "precursor," when referring to a substance (e.g., a mixture, compound, material) or structure, means and includes a substance or structure to be transformed into a resulting substance or structure. For example and without limitation, a "precursor mixture" may refer to a mixture comprising a material to be chemically altered (e.g., a chemical compound of which a bond is to be ruptured to form at least one free radical, or a chemical compound to be crosslinked with itself or with other compounds), and a "precursor elastomer material" may refer to an elastomer material that is to be crosslinked (i.e., be treated such that polymer molecules in the precursor elastomer material bond with themselves, with each other, or both to form a matrix of interbonded polymer molecules, i.e., a "crosslinked elastomer material"). The precursor elastomer material may include, in addition to the polymer molecules to be crosslinked, other materials, such as one or more of a solvent and a filler material.

As used herein, the term "initiator nanoconstituent" means and includes a nanoconstituent formulated to be reactive with (i.e., to chemically bond to) a polymer molecule, to promote bonding between available bonding sites of a polymer molecule (e.g., to crosslink one polymer molecule with itself), to promote bonding between multiple polymer molecules, or any combination thereof.

As used herein, the term "nanoconstituent" (or nanosize building block) means and includes a material comprising a chemical bond between a nanoparticle and a chemical group.

As used herein, the term "nanoparticle" means and includes any particle, such as a carbon-based or silica-based macro-molecule, having an average particle diameter (or average particle length, width, or height) of between about one nanometer (about 1 nm) and about two-hundred nanometers (about 200 nm).

As used herein, the term "free radical" means and includes an atom, molecule, subgroup of a molecule, or ion having at least one unpaired valence electron. For example, a free radical may include a carbon atom of a molecule, wherein the carbon atom has an unpaired valence electron. An atom, molecule, subgroup of a molecule, or ion represented by a letter (e.g., "X") is indicated to be a free radical herein where the letter is accompanied by a "." (e.g., "X.").

An initiator nanoconstituent, according to an embodiment of the present disclosure, includes a nanoparticle (NP) covalently bonded to a "free radical organic subgroup," i.e., an organic subgroup comprising at least one free radical.

Thus, according to some embodiments herein, the initiator nanoconstituent has the following formula:

$$\text{(NP)-Q-R.} \qquad \text{Formula I}$$

wherein
  NP represents the nanoparticle;
  Q represents either O(O=)C or N(O=)C; and
  R. represents a free radical subgroup.
The NP may be covalently bonded to Q, and Q may be covalently bonded to R..

The nanoparticle (NP) may be a carbon-based nanoparticle, such as nanoparticles of diamond, graphene, graphene oxide, carbon nanotubes, fullerene, carbon onion-like structures (e.g., a "bucky onion"). In other embodiments, the nanoparticle (NP) may be a silica-based nanoparticle (e.g., silicon dioxide ($SiO_2$)).

The Q-R. subgroup may be derived from an "organic derivative compound," such as a carboxylic acid derivative, or an amide derivative, of a peroxide compound, a diaza compound, or a disulfide compound. In embodiments in which the Q-R. subgroup is derived from a carboxylic acid derivative, Q represents O(O=)C. In embodiments in which the Q-R. subgroup is derived from an amide derivative, Q represents N(O=)C. Whether derived from a carboxylic acid derivative or derived from an amide derivative, the free radical subgroup R. may represent, for example and without limitation, of any one of the following formulas:

$$R^1. \qquad \text{Formula II}$$

$$R^2. \qquad \text{Formula III}$$

$$R^3-S. \qquad \text{Formula IV}$$

wherein Formulas II-IV are derived from carboxylic acid derivatives, or amide derivatives, of a peroxide compound, a diaza compound, and a disulfide compound, respectively.

In the free radical subgroup of Formula II, which is derived from a carboxylic acid derivative, or an amide derivative, of a peroxide compound, $R^1$. represents an organic subgroup including a free radical, which may be a terminal free radical on a carbon atom. For example and without limitation, $R^1$ may represent $(CH_2)_n$, wherein n is an integer from 1 to 24. One or more additional functional or nonfunctional groups may also be included in the organic subgroup. An initiator nanoconstituent comprising an organic subgroup of Formula II provides a "carbon-centered" free radical compound with the nanoparticle (NP) bonded to the free radical via either an ether group (—O—) (if the Q-R. subgroup is derived from a carboxylic acid derivative) or an amido group (—N—) (if the Q-R. subgroup is derived from an amide derivative).

In the free radical subgroup of Formula III, which is derived from a carboxylic acid derivative, or an amide derivative, of a diaza compound, $R^2$. represents an organic subgroup including a free radical, which may be a terminal free radical on a carbon atom. For example and without limitation, $R^2$ may represent $(CH_2)_n$, wherein n is an integer from 1 to 24. Thus, the organic subgroup including the free radical may be of the same formula whether utilizing a derivative of a peroxide compound (to provide $R^1$.) or utilizing a derivative of a diaza compound (to provide $R^2$.). One or more additional functional or nonfunctional groups may also be included in the organic subgroup. For example and without limitation, $R^2$ may represent $(CH_2)_nC(CH_3CN)$. An initiator nanoconstituent comprising a free radical subgroup of Formula III also provides a carbon-centered free radical compound with the nanoparticle (NP) bonded to the free radical via an ether group (—O—) (if the Q-R. subgroup is derived from a carboxylic acid derivative) or an amido group (—N—) (if the Q-R. subgroup is derived from an amide derivative).

In the free radical subgroup of Formula IV, which is derived from a carboxylic acid derivative, or an amide derivative, of a disulfide compound, $R^3$ represents an organic subgroup, such as, for example and without limitation, $(CH_2)_n$, wherein n is an integer from 1 to 24. One or more additional functional or nonfunctional groups may also be included in the organic subgroup. The free radical subgroup of Formula IV has a terminal free radical on a sulfur (S) atom. An initiator nanoconstituent comprising a free radical subgroup of Formula IV provides a "sulfur-centered" free radical compound with the nanoparticle (NP) bonded to the $R^3$—S. subgroup via an ether group (—O—) (if the Q-R. subgroup is derived from a carboxylic acid derivative) or an amido group (—N—) (if the Q-R. subgroup is derived from an amide derivative).

As discussed further detail below, the initiator nanoconstituents of Formula I may be formed in situ, e.g., in a precursor mixture also comprising a precursor elastomer material and may then be used to initiate in situ crosslinking of polymer molecules of the precursor elastomer material to form a crosslinked elastomer material.

Accordingly, disclosed is an initiator nanoconstituent for crosslinking an elastomer. The initiator nanoconstituent comprises a nanoparticle covalently bonded to a subgroup comprising at least one free radical.

To form the initiator nanoconstituents (Formula I) of the present disclosure, a functionalized nanoparticle may be reacted with what is referred to herein as an "organic derivative compound," which may be the carboxylic acid derivative of any one of the peroxide compound, the diaza compound, and the disulfide compound. The functionalized nanoparticle, according to embodiments herein, may have the following formula:

Formula V wherein

X represents a hydroxyl group (OH) or an amino group ($NH_2$).

In embodiments in which the nanoparticle (NP) is a silica-based nanoparticle (e.g., a silicon dioxide ($SiO_2$) nanoparticle), the nanoparticle may include a hydroxyl group without any particular processing of the nanoparticle. Therefore, formation of the silica-based nanoparticle may provide the functionalized nanoparticle of Formula VIII.

In embodiments in which the nanoparticle (NP) is carbon-based (e.g., a carbon nanotube), the carbon-based nanoparticle may be treated, e.g., with a one-step oxidation, to provide at least one hydroxyl group bonded to the nanoparticle, in accordance with Formula VIII.

The functionalized nanoparticle, of Formula V (i.e., (NP)—X), may then be reacted with the organic derivative compound to yield an "organic nanoconstituent" compound (i.e., a compound comprising the nanoparticle (NP) bonded to an organic group), according to the following reaction:

Scheme I wherein

Y represents the organic derivative compound;
(cat) represents a catalyst;
$A^1$ represents water ($H_2O$); and
Z represents the organic group of the nanoconstituent compound.

The organic derivative compound (Y) may have the following formula:

Formula VI wherein

$Y^1$ represents a carboxyl group (HO(O═)C);
R represents an organic group, which may be one of $R^1$, $R^2$, and $R^3$, depending on which of a peroxide compound derivative, a diaza compound derivative, and a disulfide compound derivative is used; and
$Y^2$ represents C(═O)—O—O—(O═)C, a diazenyl group (N═N), or a sulfur-sulfur group (S—S).

In embodiments in which the organic derivative compound (Y) is a carboxylic acid derivative, Y represents the carboxyl group (HO(O═)C). In such embodiments, $Y^2$ represents C(═O)—O—O—(O═)C if the carboxylic acid derivative is a derivative of a peroxide compound, $Y^2$ represents the diazenyl group (N═N) if the carboxylic acid derivative is a derivative of the diaza compound, and $Y^2$ represents the sulfur-sulfur group (S—S) if the carboxylic acid derivative is a derivative of a disulfide compound.

The catalyst (cat) of Scheme I may be a catalyst formulated to enable the reaction of Scheme I to proceed at a relatively-low temperature, e.g., at room temperature (about 20° C.) or mild heating (not exceeding 60° C.). Performing the reaction at the relatively-low temperature may prevent, or lessen, loss (e.g., by evaporation) of the organic derivative compound. In some embodiments, the catalyst may comprise, consist essentially of, or consist of DCC (dicyclohexyl carbodiimide), DMAP (4,4-N,N-dimethylaminopyridine), 1-ethyl-3-(3-dimethylaminopropyl)carbodiimide, diisopropylcarbodiimide, or CDI (N,N-Carbonyldiimidazole). In other embodiments, no catalyst may be used in Scheme I.

By the reaction of Scheme I, the functional group (X) from the functionalized nanoparticle ((NP)—X) breaks from the nanoparticle while a terminal hydrogen (H) breaks from the organic derivative compound (Y). The functional group (X) and disassociated hydrogen (H) then join to form compound $A^1$. In embodiments in which a hydroxy-functionalized nanoparticle is used, such that X is a hydroxy group (OH), compound $A^1$ is water $H_2O$ (e.g., steam). In embodiments in which an amino-functionalized nanoparticle is used, such that X is an amino group ($NH_2$), compound $A^1$ is also water ($H_2O$). It is contemplated that the water will be gaseous or evaporate such that compound $A^1$ will separate from the system, leaving (NP)—Z in the system.

Also by the reaction of Scheme I, the remainder of the organic derivative compound (Y), after loss of a hydrogen atom (H), substitutes for the lost functional group (X) to form the organic nanoconstituent ((NP)—Z). Thus, Z represents the organic derivative compound after loss of the hydrogen such that Z has the following formula:

Formula VII wherein Q represents the O(O═)C subgroup (in embodiments in which $Y^1$ was a carboxyl group) or (H)N(O═)C (in embodiments in which X was an amino group).

Therefore, by the reaction of Scheme I, an organic nanoconstituent compound ((NP)—Z) is formed from the functionalized nanoparticle ((NP)—X) and the organic derivative compound (Y). In the organic nanoconstituent compound ((NP)—Z), a nanoparticle is covalently bonded to an organic subgroup (i.e., R—$Y^2$—R—$Y^1$) via either an ether group (—O—) or an amido group (—N—) of the Q subgroup. Thus, the organic nanoconstituent compound ((NP)—Z) may also be represented by the following formula.

(NP)-Q-R—$Y^2$—R—$Y^1$  Formula VIII

The organic nanoconstituent compound ((NP)—Z) may then be dispersed within a precursor elastomer material to form a precursor mixture comprising polymer molecules to be crosslinked and the organic nanoconstituent compound ((NP)—Z). The precursor elastomer material may comprise a non-crosslinked, or partially crosslinked, rubber or other polymer material, such as one or more of nitrile butadiene rubber (NBR) and hydrogenated acrylonitrile butadiene rubber (HNBR), or any other polymer having aliphatic C—H bonds in a backbone chain, e.g., polyethylene, polypropylene, polystyrene, Nylon, etc. In some embodiments, the precursor elastomer material may be selected to be any polymer material known to be cross-linkable using peroxides in conventional processes.

Because the organic nanoconstituent compound ((NP)—Z), at the time of dispersal in the precursor elastomer material, is nonreactive (i.e., has no free radical sites) relative to the polymer compounds in the precursor elastomer material, the organic nanoconstituent compound ((NP)—Z) may be added to the precursor elastomer material without initiating cross-linking of the polymer molecules. This enables consistent dispersion within the precursor elastomer material, providing more complete and better dispersion than achievable by conventional methods that disperse reactive crosslinking initiator nanoconstituents in a precursor elastomer material.

Mixing of the organic nanoconstituent compound ((NP)—Z) with the precursor elastomer material may be carried out at a temperature of about 20° C. to about 50° C., i.e., at "cool" temperatures. These cool temperatures may inhibit or slow a decomposition of the organic nanoconstituent compound ((NP)—Z), which decomposition may begin crosslinking of polymer molecules in the precursor elastomer material of the precursor mixture. The cool temperatures may be instituted and controlled by, for example and without limitation, using an externally-cooled vessel in which to mix the materials; introducing a cooled inert gas into the environment in which the materials are being mixed; including a cooled, inert solvent in the precursor mixture, or some combination thereof.

After forming the precursor mixture comprising the organic nanoconstituent compound ((NP)—Z) well dispersed in the precursor elastomer material, the precursor mixture may then be treated to form the initiator nanoconstituent ((NP)-Q-R.) of Formula I. Thus, the initiator nanoconstituent (Formula I) may be formed in situ, i.e., within the precursor mixture, in the presence of the polymer molecules of the precursor elastomer material.

Treatment of the precursor mixture may include or consist of heating the precursor mixture, before or during extrusion or hot-pressing of the mixture, to a temperature at which at least one chemical bond of the organic nanoconstituent compound ((NP)—Z), also represented by Formula VIII) ruptures to form at least one free radical functionalized nanoconstituent compound, according to the following scheme:

Scheme II wherein .R—$Y^1$ represents another free radical compound (in addition to the initiator nanoconstituent of Formula I) and $A^2$ represents a side product compound, which may or may not be formed depending on the particular compound of Formula VII.

In embodiments in which the organic derivative compound (Y) was a carboxylic acid derivative of a peroxide compound (such that $Y^1$ was a carboxyl group, R was $R^1$, and $Y^2$ was a C(=O)—O—O—(O=)C group), during Scheme II, bonds of the organic nanoconstituent compound ((NP)—Z) may rupture as indicated below, by heating the precursor mixture (e.g., during extrusion or hot-pressing) to a temperature of, for example and without limitation, about 90° C. to about 120° C.:

wherein "-//-" indicates a rupturing bond. Thus, by this embodiment of Scheme II (which embodiment is referred to herein as Scheme $II_A$), two carbon dioxide ($CO_2$) molecules are formed from the $Y^2$ group, and radicals are formed on each of the $R^1$ groups, as indicated below.

Scheme $II_A$

Accordingly, by Scheme $II_A$ an initiator nanoconstituent (of Formula I) is formed having a carbon-centered free radical and in which the nanoparticle is bonded to a free radical subgroup (R.) via an ether group (—O—). Another free radical, comprising a carboxyl group ($Y^1$) bonded to another free radical subgroup (.R) is also formed.

In embodiments in which the organic derivative compound (Y) was a carboxylic acid derivative of a diaza compound (such that $Y^1$ was a carboxyl group, R was $R^2$, and $Y^2$ was a diazenyl group (N=N), during Scheme II, bonds of the organic nanoconstituent compound ((NP)—Z) may rupture as indicated below, by heating the precursor mixture (e.g., during extrusion or hot-pressing) to a temperature of, for example and without limitation, about 140° C. to about 150° C.

Thus, by this embodiment of Scheme II (which embodiment is referred to herein as Scheme II$_B$), a nitrogen molecule ($N_2$) is formed from the diazenyl group and free radicals are formed on each of the $R^2$ groups, as indicated below.

Scheme II$_B$

Accordingly, as with Scheme II$_A$, by Scheme II$_B$ an initiator nanoconstituent (of Formula I) is formed having a carbon-centered free radical and in which the nanoparticle is bonded to a free radical subgroup (R.) via an ether group (—O—). Another free radical, comprising a carboxyl group ($Y^1$) bonded to another free radical subgroup (.R) is also formed. Thus, the difference in the results of Scheme II$_B$ compared to the results of Scheme II$_A$ is the production of a nitrogen molecule ($N_2$) as a side product ($A^2$) rather than two carbon dioxide molecules ($CO_2$).

In embodiments in which the organic derivative compound (Y) was a carboxylic acid derivative of a disulfide compound (such that $Y^1$ was a carboxyl group, R was $R^3$, and $Y^2$ was an S—S group), during Scheme II, bonds of the organic nanoconstituent compound ((NP)—Z) may rupture as indicated below, by heating the precursor mixture (e.g., during extrusion or hot-pressing) to a temperature of, for example and without limitation, about 200° C.

Thus, by this embodiment of Scheme II (which embodiment is referred to herein as Scheme II$_C$), no side product ($A^2$) is produced, but free radicals are formed on each of the sulfur atoms, as indicated below.

Scheme II$_C$

Accordingly, by Scheme II$_C$ an initiator nanoconstituent (of Formula I) is formed having a sulfur-centered free radical and in which the nanoparticle is bonded to a free radical subgroup (R.) via an ether group (—O—). Another free radical, comprising a carboxyl group ($Y^1$) bonded to another free radical subgroup (.R) is also formed.

In embodiments in which the organic derivative compound (Y) was an amide derivative of a peroxide compound (such that $Y^1$ was an amide group, R was $R^1$, and $Y^2$ was a C(=O)—O—O—(O=)C group), during Scheme II, bonds of the organic nanoconstituent compound ((NP)—Z) may rupture as indicated below, by heating the precursor mixture (e.g., during extrusion or hot-pressing) to a temperature of, for example and without limitation, about 90° C. to about 120° C.

Thus, by this embodiment of Scheme II (which embodiment is referred to herein as Scheme II$_D$), two carbon dioxide ($CO_2$) molecules are formed from the $Y^2$ group, and radicals are formed on each of the $R^1$ groups, as indicated below.

Scheme II$_D$

Accordingly, by Scheme II$_D$ an initiator nanoconstituent (of Formula I) is formed having a carbon-centered free radical and in which the nanoparticle is bonded to a free radical subgroup (R.) via an amido group (—N—). Another free radical, comprising an amide group ($Y^1$) bonded to another free radical subgroup (.R) is also formed.

In embodiments in which the organic derivative compound (Y) was an amide derivative of a diaza compound (such that $Y^1$ was an amide group, R was $R^2$, and $Y^2$ was a diazenyl group (N=N), during Scheme II, bonds of the organic nanoconstituent compound ((NP)—Z) may rupture as indicated below, by heating the precursor mixture (e.g., during extrusion or hot-pressing) to a temperature of, for example and without limitation, about 140° C. to about 150° C.

Thus, by this embodiment of Scheme II (which embodiment is referred to herein as Scheme II$_E$), a nitrogen molecule ($N_2$) is formed from the diazenyl group and free radicals are formed on each of the $R^2$ groups, as indicated below.

Scheme II$_E$

Accordingly, as with Scheme II$_D$, by Scheme II$_E$ an initiator nanoconstituent (of Formula I) is formed having a carbon-centered free radical and in which the nanoparticle is bonded to a free radical subgroup (R.) via an amido group (—N—). Another free radical, comprising an amide group ($Y^1$) bonded to another free radical subgroup (.R) is also formed. Thus, the difference in the results of Scheme II$_E$ compared to the results of Scheme II$_D$ is the production of a nitrogen molecule (N$_2$) as a side product (A$^2$) rather than two carbon dioxide molecules (CO$_2$).

In embodiments in which the organic derivative compound (Y) was an amide derivative of a disulfide compound (such that Y$^1$ was an amide group, R was R$^3$, and Y$^2$ was an S—S group), during Scheme II, bonds of the organic nanoconstituent compound ((NP)—Z) may rupture as indicated below, by heating the precursor mixture (e.g., during extrusion or hot-pressing) to a temperature of, for example and without limitation, about 200° C.

Thus, by this embodiment of Scheme II (which embodiment is referred to herein as Scheme II$_F$), no side product (A$^2$) is produced, but free radicals are formed on each of the sulfur atoms, as indicated below.

Accordingly, by Scheme II$_F$ an initiator nanoconstituent (of Formula I) is formed having a sulfur-centered free radical and in which the nanoparticle is bonded to a free radical subgroup (R.) via an amido group (—N—). Another free radical, comprising an amide group (Y$^1$) bonded to another free radical subgroup (.R) is also formed.

In some embodiments, the free radical subgroups (R. and .R) of both of the initiator nanoconstituent and the another free radical compound may be chemically identical (i.e., they may have the same composition and structure of elements. In other embodiments, the free radical subgroups may not be chemically identical, e.g., if additional subgroups or different elements are included on one or both of the free radical subgroups.

With the in situ formation of the initiator nanoconstituent (of Formula I) in the precursor mixture, the initiator nanoconstituent, as well as the other products of Scheme II$_{A-F}$, are already well intermixed with the precursor elastomer material, of the precursor mixture, at the time they are formed. Therefore, once Scheme II yields the initiator nanoconstituent (of Formula I), crosslinking of polymer molecules within the precursor elastomer material may initiate due to the presence of the in situ formed initiator nanoconstituents with terminal free radicals.

At least one of a main chain, side chain, and terminal chain of a polymer molecule of the precursor elastomer material may include a bond or group having a high affinity (i.e., reactivity or polarity) to the free radical of the initiator nanoconstituent (Formula I), the another free radical compound (.R—Y$^1$), or both. Therefore, the polymer molecules may be bonded (e.g., covalently bonded) with the initiator nanoconstituent, with the another free radical compound, or both. In some embodiments, the polymer molecules may additionally bond with other polymer molecules or with another available bonding site on the same polymer molecule. Nonetheless, a crosslinked elastomer material is formed comprising a matrix of interbonded polymer materials that are also interbonded with nanoparticles via an organic subgroup and at least one of an ether group (—O—) and an amido group (—N—). One such resulting "polymer nanocomposite" compound may have the following formula:

(NP)-Q-R-(Poly)    Formula IX wherein (Poly) represents the polymer molecule. The crosslinked elastomer material may also include "polymer organocomposite" compounds having the following formula:

(Poly)-R—Y$^1$    Formula X wherein a polymer molecule has bonded (e.g., covalently bonded) with the another free radical compound produced in Scheme II. In some embodiments, a polymer molecule of the crosslinked elastomer material may bond with both the initiator nanoconstituent and the another free radical compound to produce a polymer compound having the following formula.

(NP)-Q-R-(Poly)-R—Y$^1$    Formula XI

A crosslinked elastomer material comprising polymer nanocomposites, in accordance with embodiments of the present disclosure, may have increased mechanical strength and abrasion resistance due to the matrix of interbonded nanoparticles and polymer molecules, compared to a crosslinked elastomer material having only interbonded polymer molecules and dispersed nanoparticles that are not bonded to the polymer molecules. Moreover, the in situ formation of the initiator nanoconstituents, from organic nanoconstituent compounds that have already been well dispersed in a precursor mixture including the precursor elastomer material, may enable more consistent crosslinking of the polymer molecules, through the crosslinked elastomer, compared to a conventional process that intermixes reactive vulcanizing agents in a precursor elastomer material.

Accordingly, disclosed is a method of forming a crosslinked elastomer material. The method comprises dispersing, in a precursor elastomer material, at least one compound to form a precursor mixture. The at least one compound comprises a nanoparticle bonded to a subgroup via an ether group or an amido group. The precursor mixture is heated to rupture at least one bond of the at least one compound, forming an initiator nanoconstituent comprising the nanoparticle and a terminal free radical. The initiator nanoconstituent is then bonded to a polymer molecule of the precursor elastomer material.

EXAMPLE

One particular example of a method for in situ formation of an initiator nanoconstituent and of a method of using the initiator nanoconstituent to form a crosslinked elastomer material is as follows:

First, in accordance with Scheme I, a hydroxy-functionalized carbon nanotube (CNT) is reacted with succinic acid peroxide in the presence of DCC to form water and an organic nanoconstituent compound, as follows:

wherein, of Scheme I,
(NP) represents the (CNT),
X represents the OH group,
Y represents the (HO(O=)C(CH$_2$)$_2$C(=O)—O—O—C(=O)(CH$_2$)$_2$C(=O)OH), wherein
   $Y^1$ represents the carboxyl group (HO(O=)C),
   R represents the (CH$_2$)$_2$, and
   $Y^2$ represents the C(=O)—O—O—(O=)C,
(cat) represents the DCC,
$A^1$ represents the water (H$_2$O), and
Z represents the O(O=)C(CH$_2$)$_2$C(=O)OOC(=O)(CH$_2$)$_2$C(=O)OH group, wherein
   Q represents the O(O=)C.

Second, the organic nanoconstituent compound resulting from Scheme I is then mixed with a precursor NBR material to form a precursor mixture.

Third, the precursor mixture is extruded and heated to about 90° C. to about 120° C. during extrusion of the precursor mixture. In accordance with Scheme II, the heat treatment of the precursor mixture ruptures bonds within the organic nanoconstituent to form, in situ, an initiator nanoconstituent, another free radical compound, and carbon dioxide, as follows:

wherein, of Scheme II, $A^2$ represents the 2CO$_2$.

Fourth, the in-situ formed initiator nanoconstituent reacts with a polymer molecule present in the precursor mixture, and the another free radical compound may also react with the polymer molecule or another polymer molecule to initiate crosslinking of the polymer material and convert the precursor NBR material to a crosslinked NBR comprising a polymer nanocomposite of the following formula, in which the CNT is covalently bonded to the polymer molecule via at least an ether group. More specifically, the CNT is covalently bonded to an ether group, which is bonded to an organic subgroup, which is covalently bonded to the polymer molecule.

(CNT)-O(O=)C(CH$_2$)$_2$-(Poly)

The crosslinked NBR material may also comprise one or more of the following compounds.

(Poly)-(CH$_2$)$_2$C(=O)OH (i.e., a polymer nanocomposite)

(CNT)-O(O=)C(CH$_2$)$_2$-(Poly)-(CH$_2$)$_2$C(=O)OH

One or more polymer molecules of the crosslinked NBR material may also be interbonded with other polymer molecules or bonded with itself.

In other particular embodiments, a graphene nanoparticle may be utilized as the nanoparticle (NP).

In other embodiments, the organic derivative compound may be 4,4'-Azobis(4-cyanovaleric acid) (HO(O=)C(CH$_2$)$_2$C(CH$_3$)(CN)N=N(CN)(CH$_3$)C(CH$_2$)$_2$C(=O)OH), in which embodiments the initiator nanoconstituent and a resulting polymer nanocomposite may have the following formulas, respectively:

(NP)—O(O=)C(CH$_2$)$_2$C(CH$_3$)(CN).

(NP)—O(O=)C(CH$_2$)$_3$-(Poly)

wherein the free radical of the initiator nanoconstituent may be on the carbon atom to which the methyl group (CH$_3$) and the cyano group (CN) are bonded.

In other embodiments, the organic derivative compound may be glutaric peroxide acid (HOOC(CH$_2$)$_3$C(=O)—O—O—C(=O)(CH$_2$)$_3$C(=O)OH), in which embodiments the initiator nanoconstituent and a resulting polymer nanocomposite may have the following formulas, respectively:

(NP)—O(O=)C(CH$_2$)$_3$.

(NP)—O(O=)C(CH$_2$)$_3$-(Poly)

wherein the free radical of the initiator nanoconstituent may be on the terminal carbon atom of the (CH$_2$)$_3$ chain. Therefore, while the example using succinic acid peroxide as the organic derivative compound (Y) yielded an initiator nanoconstituent with an O(O=)C(CH$_2$)$_2$. subgroup, beginning with glutaric peroxide acid as the organic derivative compound (Y) yields an initiator nanoconstituent with an O(O=)C(CH$_2$)$_3$. subgroup.

Crosslinked elastomers, formed using an initiator nanoconstituent and/or a method of formation according to any embodiment of the present disclosure, may be incorporated and used in downhole tools or components thereof. As nonlimiting examples, a crosslinked elastomer, according to embodiments of the present disclosure, may be included in an elastomer packing element of a retrievable packer tool application (FIGS. 1 and 2), in a sealing element for a packer (FIG. 3), or an elastomer element of a stator former of a downhole drilling motor (FIG. 4).

Figure 1:
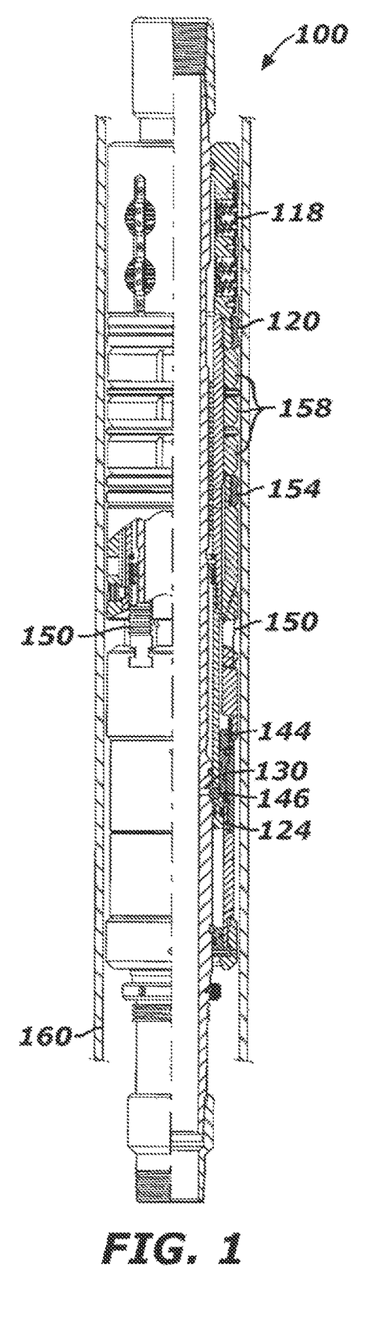
FIG. 1 is a partially sectioned, elevation view of a retrievable packer tool having elastomer elements according to an embodiment of the present disclosure.
Figure 2:
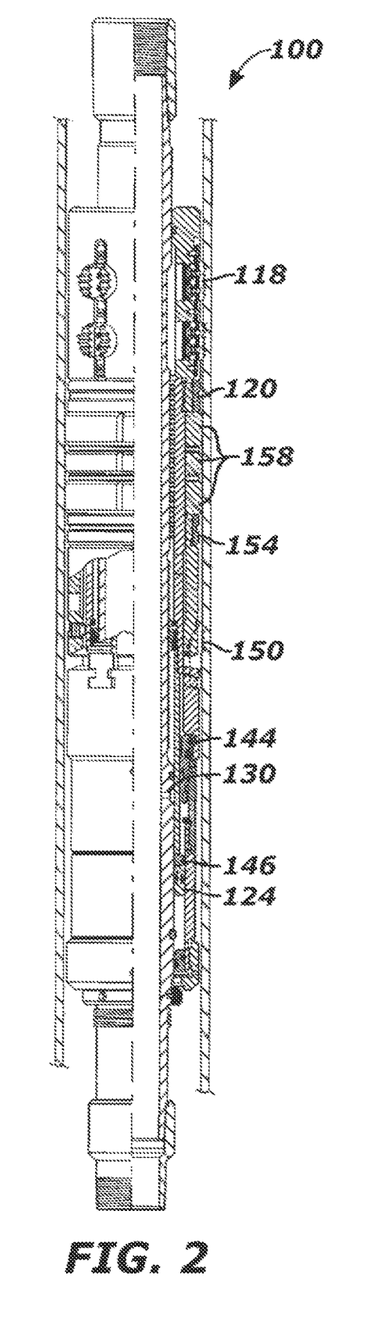
FIG. 2 is a partially sectioned, elevation view of the retrievable packer tool of FIG. 1 in an operating configuration for sealing a well casing annulus.

With reference to FIGS. 1 and 2, an embodiment of a retrievable packer tool is illustrated. "Packers" are useful tools for sealing spaces separating upper and lower portions of a well depth. That is, well pipe, such as coiled or threaded production tubing, for example, may be surrounded by an annular space between the exterior wall of the tubing and the interior wall of the well casing or borehole wall. Frequently, it is necessary to seal this annular space between upper and lower portions of a well depth, and a packer may be used for this purpose.

Traditionally, the sealing element of some conventional packers is one or more adjacent rings of rubber or other elastomer that is in some manner sealed between a mandrel of the packer and an interior surface of a wellbore tubular, such as a casing or liner. For example, the ring of rubber is expanded, by longitudinally applied forces, radially against the casing or borehole wall. One of the greater utilities for a well packer is to isolate a designated section of a wellbore along the wellbore length penetrating a particular zone or earth strata. In some cases, the isolated zone contain, or have generated within, an inordinately high wellbore pressure in comparison to adjacent areas of the wellbore annulus. For that reason, the packer may be required to confine an unusually high-pressure differential.

A retrievable packer tool 100 is illustrated in FIG. 1. The retrievable packer tool 100 comprises one or more elastomer packing elements 158, which may be disposed between an upper gage ring 120 and a lower gage ring 154. The packing elements 158 may be NBR, HNBR, FEPM, or FKM polymers that have been crosslinked according to any of the methods disclosed herein. Thus, the packing elements 158 may be formed using any of the initiator nanoconstituents disclosed herein, and the crosslinked elastomer of the packing elements 158 includes a polymer nanocomposite comprising a nanoparticle covalently bonded to a polymer molecule via one of an ether group and an amide group and, optionally, also via an organic group.

The run-in, unset state of the retrievable packer tool is illustrated in FIG. 1, wherein the packer elements 158 are uncompressed between the upper gage ring 120 and the lower gage ring 154. The retrievable packer tool 100 may then be disposed at a desired downhole position within a casing 160, as represented in FIG. 2. Then, fluid pressure within a tubing flow bore may be increased, transferred through a mandrel aperture 130, and brought to bear against a lower edge of a retainer piston 144 causing the retainer piston 144 to shift upwardly and away from a retainer ring 146. When released, in situ well pressure against a connector mandrel piston 124 pulls the upper gage ring 120 compressively against the packer elements 158 and the lower gage ring 154. Simultaneously, slips 118 and 150 are set into the wall surface of casing 160 (FIG. 1) to prevent longitudinal movement of retrievable packer tool 100. Axial compression of the packer elements 158 expands the elastomer material radially into fluid-tight engagement with the inside walls of the casing 160.

Figure 3:
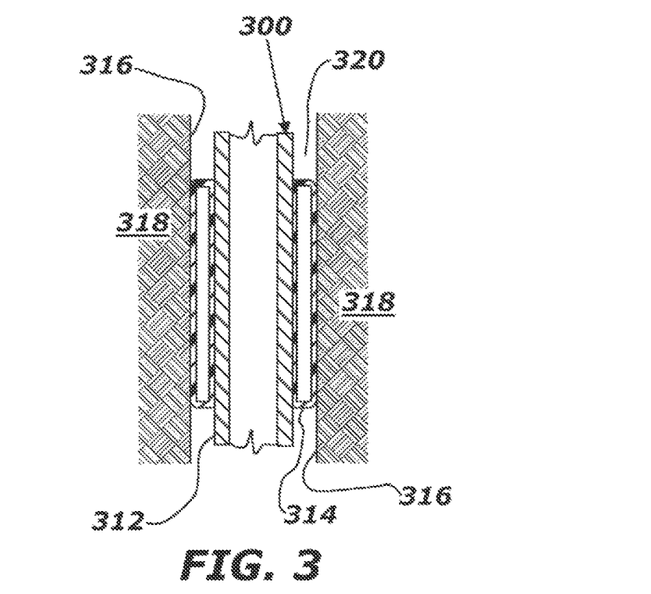
FIG. 3 is a schematic, cross-sectioned, elevation view of a downhole tool with an elastomer sealing element, according to an embodiment of the present disclosure, wherein the sealing element is disposed against the wall of a well borehole into which it has been inserted.
Figure 4:
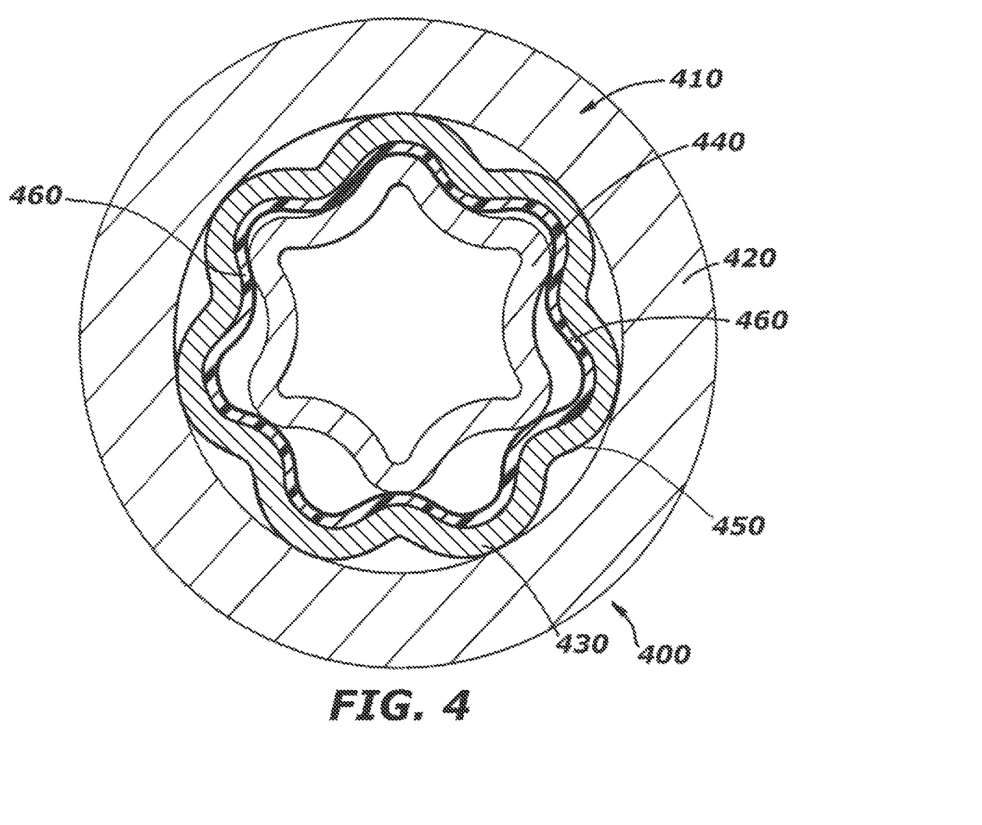
FIG. 4 is a schematic, cross-sectioned, plan view of a wellbore tool comprising a downhole motor including a stator having therein a coating comprising an elastomer according to an embodiment of the present disclosure.

Another embodiment of a packer downhole tool is schematically illustrated in FIG. 3. The overall downhole tool or downhole zone isolator (packer) 300 in the form of a so-called inflatable packer has a central support substrate or mandrel 312, shown in partial cross-section as of generally tubular shape, around which has been secured a sealing element 314 in the form of a bladder. The sealing element 314 may include a crosslinked elastomer formed according to any of the methods disclosed herein. Thus, the sealing element 314 may have been formed using any of the initiator nanoconstituents disclosed herein, and the crosslinked elastomer of the sealing element 314 includes a polymer nanocomposite comprising a nanoparticle covalently bonded to a polymer molecule via one of an ether group and an amide group and, optionally, also via an organic group. The sealing element 314, when inflated by pressurized fluid, contacts and seals against the borehole wall 316 of a subterranean formation 318. In this manner, wellbore 320 is sealed at this point.

Another embodiment of a downhole tool having a component comprising a crosslinked elastomer is illustrated in FIG. 4. Illustrated is a lateral cross-section of a drive section 410 of a downhole drilling motor 400. The motor 400 is a multi-lobed assembly used to drive drilling tools, such as a drill bit and the like, by pumping drilling fluid through the drive section 410 of the motor 400. As is typical of such motors 400, a stator/rotor drive converts the fluid energy of the drilling fluid in a rotation and processional motion to turn an operatively-connected drill bit downhole.

The drive section 410 of the motor 400 includes an outer case 420 within which is disposed a rigid stator former 430. The stator former 430 has a helical, multi-lobed configuration. The stator former 430 may be formed of a rigid material, such as a metal or metal alloy. A multi-lobed helical rotor 440 is disposed within the stator former 430 for rotation therein as drilling fluid is pumped through the stator former 430 to drive a drill bit.

An inner surface 450 of the stator former 430 is lined with a coating 460, which may comprise an elastomer material configured to sealingly engage portions of the rotor 440 as it rotates within the stator former 430. The coating 460 may comprise, consist essentially of, or consist of any of the embodiments of crosslinked elastomers described herein, and the coating 460 may be formed in accordance with any of the methods for forming crosslinked elastomers described herein. Thus, the coating 460 comprises a polymer nanocomposite comprising a nanoparticle covalently bonded to a polymer molecule via an ether group or an amide group and, optionally, also an organic group.

In any of the downhole tools or components illustrated in FIGS. 1 through 4 comprising crosslinked elastomer materials, according to embodiments of the present disclosure, the elastomer components may have a longer use life, higher abrasion resistance, and higher strength, compared to conventional crosslinked elastomer components that do not include an elastomer crosslinked with polymer nanocomposites. That is, the interbonding of the nanoparticles with the interbonded polymer material increases the mechanical strength and abrasion resistance of the crosslinked elastomer material. Moreover, the use of initiator nanoconstituents formed in situ enables the initiator nanoconstituents to be well dispersed within the precursor elastomer material before crosslinking is initiated. Therefore, the crosslinked elastomer material, according to embodiments herein, may be more uniformly crosslinked compared to crosslinked elastomer material formed by conventional processes that incorporate reactive vulcanizing agents into a precursor elastomer material.

Accordingly, disclosed is a downhole tool comprising a crosslinked elastomer material. The crosslinked elastomer material comprises a polymer molecule bonded to a subgroup covalently bonded to a nanoparticle.

Additional non-limiting example embodiments of the disclosure are described below.

Embodiment 1

An initiator nanoconstituent for crosslinking an elastomer, the initiator nanoconstituent comprising a nanoparticle covalently bonded to a subgroup comprising at least one free radical.

Embodiment 2

The initiator nanoconstituent of Embodiment 1, wherein the nanoparticle is covalently bonded to the subgroup via at least one of an ether group and an amide group.

Embodiment 3

The initiator nanoconstituent of Embodiment 1, wherein the at least one free radical is a terminal carbon atom.

Embodiment 4

The initiator nanoconstituent of Embodiment 1, wherein the at least one free radical is a terminal sulfur atom.

Embodiment 5

The initiator nanoconstituent of Embodiment 1, wherein: the nanoparticle is a carbon nanotube, and the subgroup has the following formula O(O=)C(CH$_2$)$_x$·, wherein x is 2 or 3 and · represents a free radical site.

Embodiment 6

A downhole tool comprising a crosslinked elastomer material, the crosslinked elastomer material comprising a polymer molecule bonded to a subgroup covalently bonded to a nanoparticle.

Embodiment 7

The downhole tool of Embodiment 6, wherein the polymer molecule is covalently bonded to the subgroup.

Embodiment 8

The downhole tool of Embodiment 6, wherein the nanoparticle is covalently bonded to the subgroup via one of an ether group and an amide group.

Embodiment 9

The downhole tool of Embodiment 6, wherein the downhole tool comprises a packer tool including a packer element comprising the crosslinked elastomer material.

Embodiment 10

The downhole tool of Embodiment 6, wherein the downhole tool comprises a downhole drilling motor including a drive section having a stator former comprising a coating comprising the crosslinked elastomer material.

Embodiment 11

A method of forming a crosslinked elastomer material, comprising: dispersing, in a precursor elastomer material, at least one compound to form a precursor mixture, the at least one compound comprising a nanoparticle bonded to a subgroup via an ether group or an amido group; heating the precursor mixture to rupture at least one bond of the at least one compound, forming an initiator nanoconstituent comprising the nanoparticle and a terminal free radical; and bonding the initiator nanoconstituent to a polymer molecule of the precursor elastomer material.

Embodiment 12

The method of Embodiment 11, further comprising, before the dispersing act, reacting a functionalized nanoparticle with an organic derivative compound, the functionalized nanoparticle comprising the nanoparticle, the organic derivative compound selected from the group consisting of a carboxylic acid derivative of a peroxide compound, a carboxylic acid derivative of a diaza compound, a carboxylic acid derivative of a disulfide compound, an amide derivative of a peroxide compound, an amide derivative of a diaza compound, and an amide derivative of a disulfide compound.

Embodiment 13

The method of Embodiment 12, further comprising, before the dispersing act, reacting a functionalized nanoparticle with an organic derivative compound, the functionalized nanoparticle comprising the nanoparticle, the organic derivative compound having the following formula:

wherein
$Y^1$ represents one of a carboxyl group and an amide group;
R represents an organic group; and
$Y^2$ represents one of C(=O)—O—O—(O=)C, N=N, and S—S.

Embodiment 14

The method of Embodiment 11, wherein heating the precursor mixture also forms another free radical compound in addition to the initiator nanoconstituent.

Embodiment 15

The method of Embodiment 14, further comprising bonding the another free radical compound with another polymer molecule of the precursor elastomer material.

Embodiment 16

The method of Embodiment 11, wherein dispersing, in a precursor elastomer material, at least one compound comprises cooling the precursor elastomer material while dispersing the at least one compound.

Embodiment 17

The method of Embodiment 11, further comprising, before the dispersing, reacting a hydroxy-functionalized carbon nanotube with at least one of succinic acid peroxide and glutaric peroxide acid to form the at least one compound, the nanoparticle comprising the carbon nanotube, the subgroup comprising an oxygen-oxygen (O—O) group, and the carbon nanotube being bonded to the subgroup via the ether group.

Embodiment 18

The method of Embodiment 17, further comprising selecting the precursor elastomer material to comprise a precursor nitrile butadiene rubber (NBR) material.

Embodiment 19

The method of Embodiment 17, wherein heating the precursor mixture comprises heating the precursor mixture to rupture a bond of the oxygen-oxygen (O—O) group in the subgroup.

Embodiment 20

The method of Embodiment 17, wherein heating the precursor mixture comprises forming another free radical compound comprising another terminal free radical, the another free radical compound comprising a carboxyl group bonded to an organic group.

Although the foregoing description contains many specifics, these are not to be construed as limiting the scope of the present disclosure, but merely as providing certain embodiments. Similarly, other embodiments of the initiator nanoconstituents, downhole tools, downhole tool components, and methods of formation may be devised that do not depart from the scope of the present disclosure. For example, features described herein with reference to one embodiment also may be provided in others of the embodiments described herein. The scope of the invention is, therefore, indicated and limited only by the appended claims and their legal equivalents, rather than by the foregoing description. All additions, deletions, and modifications to the embodiments, as disclosed herein, which fall within the meaning and scope of the claims, are encompassed by the present disclosure.

What is claimed is:

1. An initiator nanoconstituent for crosslinking an elastomer, the initiator nanoconstituent comprising a nanoparticle covalently bonded via an —O(O═)C— group or an —N(O═)C— group to a subgroup comprising at least one free radical terminal carbon atom, the —O(O═)C— group or the —N(O═)C— group being directly bonded to the nanoparticle.

2. An initiator nanoconstituent for crosslinking an elastomer, the initiator nanoconstituent comprising a nanoparticle covalently bonded via an —O(O═)C— group or an —N(O═)C— group to a subgroup comprising at least one free radical terminal carbon atom.

3. The initiator nanoconstituent of claim 1, wherein:
the nanoparticle is a carbon nanotube,
the nanoparticle is covalently bonded via the —O(O═)C— group to the subgroup, and
the subgroup has the following formula $(CH_2)_x.$, wherein x is 2 or 3 and . represents a free radical site.

4. A method of forming a crosslinked elastomer material, comprising:
dispersing, in a precursor elastomer material, at least one compound to form a precursor mixture, the at least one compound comprising a nanoparticle covalently bonded via an —O(O═)C— group or an —N(O═)C— group to a subgroup;
heating the precursor mixture to rupture at least one bond of the at least one compound, forming an initiator nanoconstituent comprising the nanoparticle covalently bonded via the —O(O═)C— group or the —N(O═)C— group to the subgroup now comprising a free radical terminal carbon atom, the —O(O═)C— group or the —N(O═)C— group being directly bonded to the nanoparticle; and
bonding the initiator nanoconstituent to a polymer molecule of the precursor elastomer material.

5. The method of claim 4, further comprising, before the dispersing act, reacting a functionalized nanoparticle with an organic derivative compound, the functionalized nanoparticle comprising the nanoparticle, the organic derivative compound selected from the group consisting of a carboxylic acid derivative of a peroxide compound, a carboxylic acid derivative of a diaza compound, an amide derivative of a peroxide compound, and an amide derivative of a diaza compound.

6. The method of claim 5, further comprising, before the dispersing act, reacting a functionalized nanoparticle with an organic derivative compound, the functionalized nanoparticle comprising the nanoparticle, the organic derivative compound having the following formula:

wherein
$Y^1$ represents one of a carboxyl group and an amide group;
R represents an organic group; and
$Y^2$ represents one of C(═O)—O—O—(O═)C and N═N.

7. The method of claim 4, wherein heating the precursor mixture also forms another free radical compound in addition to the initiator nanoconstituent.

8. The method of claim 7, further comprising bonding the another free radical compound with another polymer molecule of the precursor elastomer material.

9. The method of claim 4, wherein dispersing, in a precursor elastomer material, at least one compound comprises cooling the precursor elastomer material while dispersing the at least one compound.

10. The method of claim 4, further comprising, before the dispersing act, reacting a hydroxy-functionalized carbon nanotube with at least one of succinic acid peroxide and glutaric peroxide acid to form the at least one compound, the nanoparticle comprising the carbon nanotube, the subgroup comprising an oxygen-oxygen (O—O) group, and the carbon nanotube being bonded to the subgroup via the —O(O═)C— group.

11. The method of claim 10, further comprising selecting the precursor elastomer material to comprise a precursor nitrile butadiene rubber (NBR) material.

12. The method of claim 10, wherein heating the precursor mixture comprises heating the precursor mixture to rupture a bond of the oxygen-oxygen (O—O) group in the subgroup.

13. The method of claim 10, wherein heating the precursor mixture comprises forming another free radical compound comprising another terminal free radical, the another free radical compound comprising a carboxyl group bonded to an organic group.

* * * * *

UNITED STATES PATENT AND TRADEMARK OFFICE
CERTIFICATE OF CORRECTION

PATENT NO.        : 9,938,771 B2
APPLICATION NO.   : 14/531218
DATED             : April 10, 2018
INVENTOR(S)       : Valery N. Khabashesku and James Edward Goodson Page 1 of 1

It is certified that error appears in the above-identified patent and that said Letters Patent is hereby corrected as shown below:

In the Specification
Column 6,    Line 20,    change "Y represents the" to --$Y^1$ represents the--
Column 9,    Line 63,    change "group (Y') bonded" to --group ($Y^1$) bonded--

Signed and Sealed this
Eighteenth Day of September, 2018

Andrei Iancu
*Director of the United States Patent and Trademark Office*